United States Patent [19]

Matthews

[11] 4,445,844

[45] May 1, 1984

[54] LIQUID FUEL AND AIR FEED APPARATUS FOR FLUIDIZED BED BOILER

[75] Inventor: Francis T. Matthews, Poquonock, Conn.

[73] Assignee: Combustion Engineering, Inc., Windsor, Conn.

[21] Appl. No.: 451,114

[22] Filed: Dec. 20, 1982

[51] Int. Cl.³ ............................................. F23D 19/02
[52] U.S. Cl. ...................................... 431/170; 431/7; 122/4 D
[58] Field of Search ................... 122/4 D; 431/7, 170; 422/143, 311; 432/58, 15; 239/533.3; 34/57 A Primary Examiner—Carroll B. Dority, Jr.
Assistant Examiner—Helen A. Odar
Attorney, Agent, or Firm—Robert L. Olson

[57] ABSTRACT

A fluidized bed furnace is provided in which liquid fuel can be burned. Injectors extend up through an imperforate bed plate which properly mix the oil or other liquid fuel with the fluidizing air causing evaporation of the oil. This mixture is passed through restricted openings as it enters the fluidized bed, thus resulting in high velocity flow and fairly even fuel and combustion distribution throughout the cross-section of the fluidized bed.

5 Claims, 5 Drawing Figures

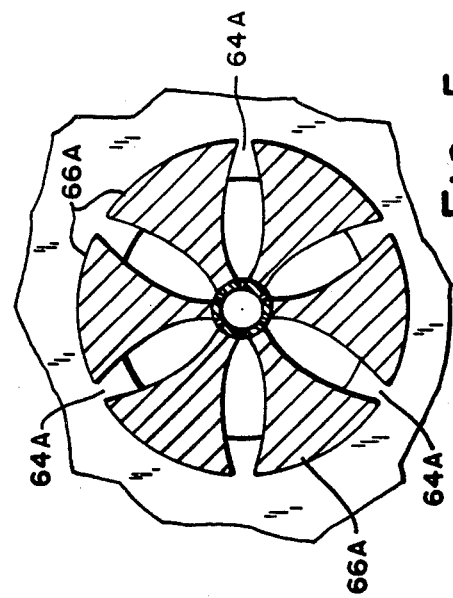
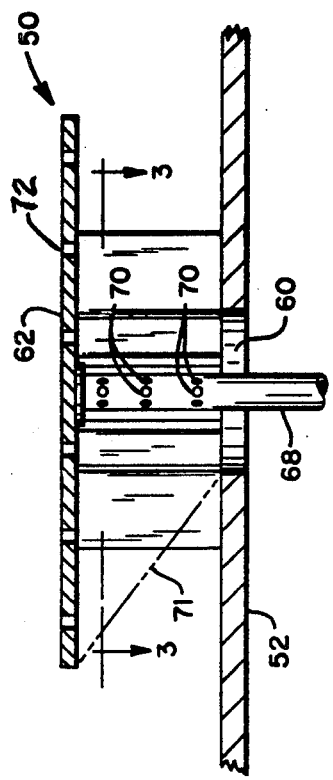
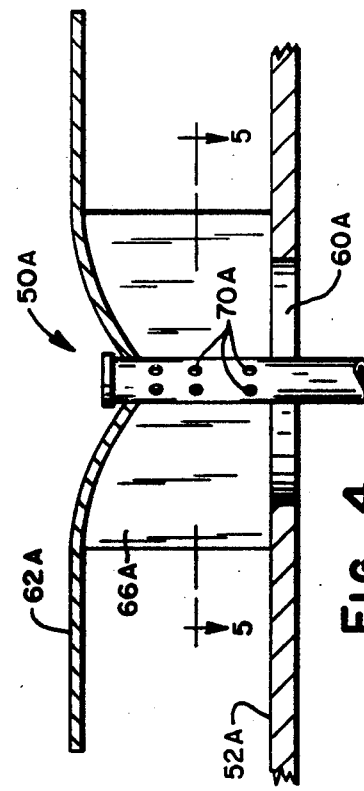
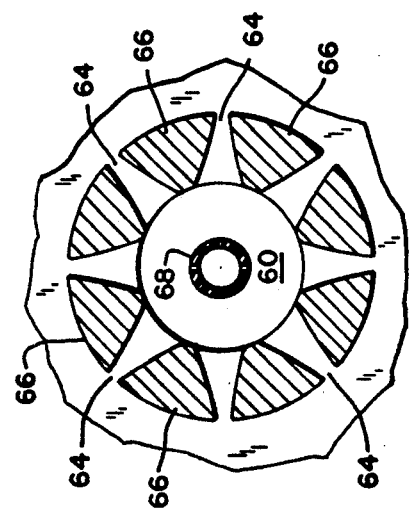

LIQUID FUEL AND AIR FEED APPARATUS FOR FLUIDIZED BED BOILER

BACKGROUND OF THE INVENTION

In recent years, much time and effort has been expended in trying to develop means by which coal can be cleanly burned. One means of accomplishing this is by burning it in a fluidized bed to which limestone is added. The limestone reacts with the sulfur in the coal to form calcium sulfate, preventing the formation of $SO_x$ in the exhaust gases which would pollute the atmosphere. Although there is a considerable amount of liquid fuels, heavy residuals, and other lighter oils available that contain high sulfur, little effort has been made to develop a system for burning these fuels cleanly. It is difficult to burn these fuels in a fluidized bed since it is difficult to get good fuel distribution throughout the bed. Also, carbonization of the fuel injector nozzles can be a problem.

SUMMARY OF THE INVENTION

In accordance with the invention, a fluidized bed is provided in which liquid fuels can be burned. The fluidized bed support plate has a plurality of multi-nozzle air-fuel injectors extending up through it, which direct the fuel-air mixture horizontally into the bed. The distance between injectors is such that the air-fuel jets will impinge on each other and promote thorough mixing. The nozzle configurations also produce high velocities in order to sweep the bed solid particles out from between the injectors.

BRIEF DESCRIPTION OF THE DRAWINGS

FIG. 2 is an enlarged view of one of the multi-nozzle air-fuel injectors shown in FIG. 1;

FIG. 3 is a view taken on line 3—3 of FIG. 2;

FIG. 4 is an alternative embodiment of a multi-nozzle air-fuel injector; and

FIG. 5 is a view taken on line 5—5 of FIG. 4.

DESCRIPTION OF THE PREFERRED EMBODIMENT

Figure 1:
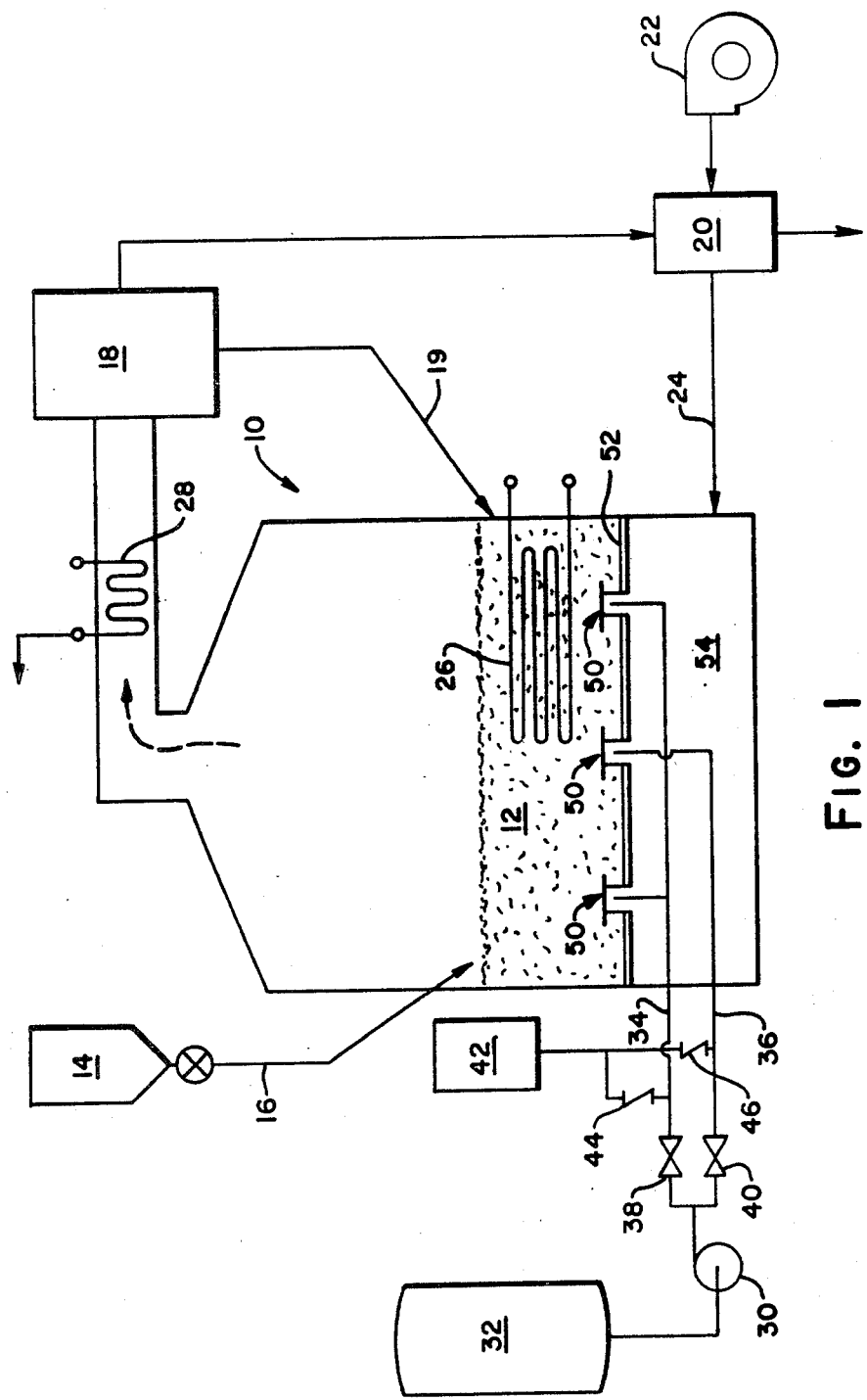
FIG. 1 is a schematic view of a fluidized bed for burning liquid fuel therein.

Looking now to FIG. 1 of the drawings, numeral 10 designates a fluidized bed furnace containing a bed of solid material 12 in which liquid fuel can be burned. Limestone is added to the bed from storage hopper 14 through valved line 16. The limestone reacts with the sulfur dioxide formed during combustion of the fuel, forming calcium sulfate, preventing the formation of noxious $SO_x$ in the exhaust gases leaving the furnace. The exhaust gases from the unit pass through particulate removal apparatus 18, where char and other solids are removed from the gas and recycled back to the furnace bed through line 19. The gas then passes through an air heater 20 before being exhausted to the atmosphere. Air from fan 22 is heated in air heater 20 and then flows by way of duct 24 to the fluidized bed furnace 10. Heat is removed from the fluidized bed by heat exchange surface 26. Heat is also removed from the exhaust gases in convective tube banks 28. If desired, the walls of the furnace can be lined with steam generating tubes also.

The liquid fuel is pumped by fuel pump 30 from liquid storage tank 32 through lines 34 and 36. These lines contain shutoff and control valves 38 and 40, respectively. An inert purge gas system is available to purge the fuel lines when specific fuel lines are shut off, to prevent coking and plugging of the lines and their associated injectors. This consists of a source of pressurized inert gas 42, and valves 44 and 46. The liquid fuel is introduced into the fluidized bed 12 through a plurality of multi-nozzle air-fuel injectors 50. A solid bed support plate 52 is employed as compared to a conventional perforated plate. The solid bed plate 52 incorporates the injectors 50 placed on regular spacing. The distance between injectors is such that the air-fuel jets will impinge on each other and promote intimate mixing. The air from duct 24 enters the plenum 54 below the bed plate 52 and also flows to the fluidized bed 12 through the injectors 50. It is this air which fluidizes the bed 12 and also supports combustion of the fuel.

Looking now to FIGS. 2 and 3, one of the air-fuel injectors 50 is shown in more detail. Air enters the injector flowing upwardly in passage 60, is turned horizontally by upper cap 62, and is ejected from the converging radial nozzle passages 64 (FIG. 3), located between the nozzle blocks 66. The oil feed line 68 extends up to the upper cap 62 and contains a plurality of openings or jet holes 70. These openings 70 admit fuel to the root of each radial nozzle passage 64. The fuel is carried out of the ejectors by the air.

The nozzle 64 configurations will produce high velocities which will sweep bed solid particles out from between the ejectors. This is in contrast to a perforated plate which is meant to produce little disturbance of the bed particles. The advantages to having a high flow velocity is manifold; it prevents bed particles from being coated with oil; it prevents the plugging of the ejector; it provides a particle-free zone for liquid-air mixing and vaporization; and it provides topside cooling of the plate 52, reducing the possibility of thermal warping.

The top cap 62 is of sufficient size that the angle of repose of the bed particles, shown in phantom line at 71 (FIG. 2), does not permit particles to fall into the plenum beneath plate 52 through passage 60 during low load operation or when the unit is shut down. The top cap 62 has a number of air passages 72 therethrough so as to provide the space above the top cap 62 with sufficient air to fluidize the bed material in this location.

FIGS. 4 and 5 show an alternative embodiment of a multi-nozzle air-fuel injector 50A. In this arrangement the cap plate 62A is curved, so as to aid the air flowing in vertical passage 60A to make the turn to the horizontal direction as smoothly and with as little disturbance as possible. Also, the nozzle blocks 66A are attached to and supported by the fuel feed line 68A. The jet holes 70A direct the oil into the passage ways 64A. These passageways 64A converge in the same manner as passageways 64 do in the FIG. 3 embodiment so as to result in a high velocity flow of the air and fuel leaving the injector.

I claim:

1. In combination, a fluidized bed furnace in which fluid fuel is burned including chamber means, a base plate forming the bottom of the chamber means, solid particles positioned above the base plate which forms the material making up the fluidized bed, a plurality of injector means extending up through the base plate, each injector means including a central vertical pipe means closed as its top, means for supplying fuel to the vertical pipe means, mean forming an open annular space surrounding the vertical pipe means, means for supplying air up into the annular space from beneath the base plate, said base plate being imperforate except for said means for supplying air to said annular spaces, means forming a plurality of radial passage means extending outwardly from the annular space, each radial passage means having a restricted flow portion near its outer end, and opening means in the vertical pipe means in alignment with said radial passage means for directing fuel into each of the radial passage means.

2. The combination set forth in claim 1, including cap means positioned above the annular space and radial passage means to prevent the solid particles from falling through the base plate by way of the injector means.

3. The combination set forth in claim 2, wherein the cap means is of such size that solid particles will not reach the opening in the base plate when they lie at the angle of repose extending downwardly from the edge of the cap means.

4. The combination set forth in claim 3, wherein the cap means has a plurality of openings therein through which air flows so as to maintain the solid particles above the cap means in a fluidized state.

5. The combination set forth in claim 3, wherein the cap means extends upwardly and outwardly away from the vertical pipe means in a gradual curved surface so that the airflow makes a smooth turn from the vertical to the horizontal.

* * * * *